Dec. 7, 1954  M. BOZICHOVICH  2,696,352
APPARATUS FOR USE IN OPENING BALES OF SCRAP METAL
Filed Dec. 21, 1950
Fig. 1
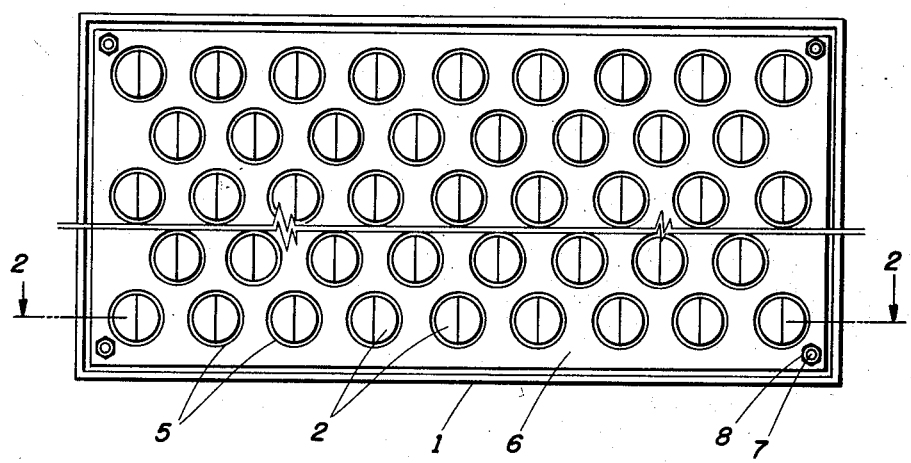
Fig. 2
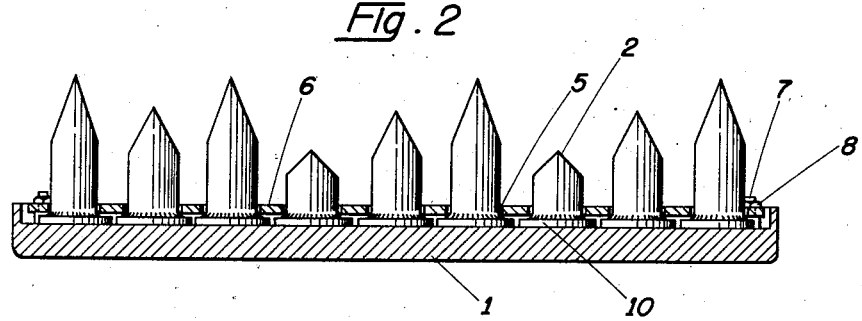
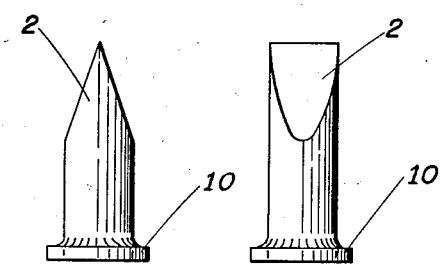
Fig. 3  Fig. 4
Inventor
MATT BOZICHOVICH
By
Attorney

United States Patent Office 2,696,352
Patented Dec. 7, 1954

2,696,352
APPARATUS FOR USE IN OPENING BALES OF SCRAP METAL

Matt Bozichovich, Campbell, Ohio

Application December 21, 1950, Serial No. 201,917

2 Claims. (Cl. 241—301)

This invention is directed primarily to apparatus useful for opening or disintegrating bales of scrap metal to permit examination of their contents and comprises means providing a plurality of sharp-edged wedging elements or hardy pins adapted to penetrate a bale when brought into forcible contact therewith to thereby physically disperse the scrap metal pieces and other material, if any, comprised in the bale.

Ferrous metal scrap is extensively used in the steel industry being charged with pig iron and other components into open hearth furnaces where they are melted and blended together in the manufacture of new steel and much of this scrap metal is procured by purchase from independent dealers from whom it is received in the form of generally rectangular self-coherent bales. To be satisfactorily employed in the manufacture of new steel bales should contain only ferrous metal but through accident or by design of the baler they nevertheless more or less frequently contain contaminants such as Monel metal, copper, zinc, lead, aluminum, brass, babbitt, plastics, wood and other materials in such proportions as to render undesirable their use as furnace charging stock.

Some purchasers investigating the composition of baled scrap purchased on the open market have obtained at considerable effort and expense actual analyses of the bales and have discovered therein not only excessive quantities of non-ferrous metal content but, in some instances brick, dirt, cement blocks and other weight making contaminants as well, these latter, at least, presumably having been included intentionally in the expectation that the purchaser, relying upon the integrity of the supplier would charge the bales into a furnace as received and without analyzing any of them.

To prevent such practices, whether intentionally or inadvertently permitted, it has been suggested that a regular close check of random samples from each lot of baled scrap offered with rejection of the entire lot upon discovery of excessive foreign material in one or more of the bales in it might induce dealers in scrap metal to exercise greater care toward exclusion of such material in making up the bales.

But the extreme pressures necessary to produce self-coherent bales make separation from each other of the individual pieces in a bale quite difficult, and it has been found either impractical or too costly to make regular examinations of bales of ferrous metal scrap by cutting them open with an oxy-acetylene torch, by shearing the bales, or by drilling them, inserting explosive into the drilled hole and then detonating it, and the present invention is consequently directed to apparatus useful for opening the bales without involving impractical and/or unduly expensive methods of this kind.

It is therefore a principal object of the invention to provide means which may be employed in association with other apparatus for disintegrating bales of scrap metal to permit inspection of their contents prior to charging into a melting furnace or the like.

A further object is to provide apparatus embodying a plurality of relatively sharp-edged wedging elements arranged in proximity to each other whereby a bale of scrap metal when dropped from a considerable height upon their upwardly projecting sharp end edges is automatically opened and individual pieces of the material in the bale separated from each other to facilitate their examination.

Other objects, purposes and advantages of the invention will hereafter more fully appear or will be understood from the following description of a preferred embodiment of it illustrated in the accompanying drawing, in which Fig. 1 is a fragmentary top plan view of my apparatus;
Fig. 2 is a longitudinal vertical section thereof on the line 2—2 in Fig. 1 and in the direction of the arrows;
Fig. 3 is an enlarged side elevation of one of the wedging elements forming a part of said apparatus but removed therefrom and viewed similarly to the showing in Fig. 2, and
Fig. 4 is a corresponding front view of the element.

Referring now more particularly to the drawing the apparatus comprises a base plate 1 which is of relatively heavy metal construction similar to that employed in the steel industry for bed plates for annealing boxes, a discarded anealing box bed plate in reasonably good condition being entirely suitable for use as the base plate. On the upper surface of this plate a plurality of wedging elements or hardy pins 2 of several different lengths are arranged more or less at random as to length and preferably in upstanding rectilinear staggered rows at suitable laterally spaced intervals corresponding individually to holes 5 in a cover plate 6 supported at its corners from shouldered studs 7 projecting upwardly from the bed plate, the cover plate being secured to the studs by nuts 8 threaded on the latter.

Each pin of whatever length is provided at its base with an annular flange 10 preferably welded to the pin and extending radially from it so that when the cover plate is assembled with the pins and base plate and secured by the nuts with the pins projecting through the holes 5 the latter afford clearances for the bodies of the pins while the plate overlies the flanges 10 and prevents withdrawal of the pins through the plate.

The pins are made preferably from round bar stock of suitable steel about 6" in diameter when utilized in apparatus including a base plate about ten feet square with which about 60 to 70 pins are employed in all, and the holes in the plate are of somewhat greater diameter to provide the above-mentioned clearance. The upper extremities of the pins are formed with acute-angled or chisel edges defined by horizontal intersections of converging plane faces; conveniently one third of the pins may be about nine inches long, one third about fourteen inches long and one third about eighteen inches long, although their specific distribution both as to length and as to relative position on the base plate is largely a matter of choice, it being preferable however that each pin be either longer or shorter than at least most of the immediately adjacent ones when the apparatus is assembled.

For opening a bale of scrap metal with the aid of this apparatus the latter is positioned on a substantial horizontal support, for example on the ground or suitable firm and solid floor, the bale to be opened is elevated by a crane comprising a lifting magnet or other appropriate lifting mechanism to a considerable height, say about 80–90 feet, directly above the pins and then released and allowed freely to fall vertically upon the latter, when the pins by the wedging action of their ends impale the bale, tend to separate its component parts from each other and sometimes disperse them sufficiently on a single drop to permit adequate inspection to be made. Generally, however, a bale of metal scrap must be lifted and dropped upon the pins several successive times, depending to some extent on the proportion and kind of foreign matter included in it, the height from which it is dropped, and the extent of penetration progressively effected by the different length pins; ordinary bales of ferrous metal scrap averaging about 16" x 24" x 30" usually must be dropped two to twelve times from a height of 80 to 90 feet upon relatively sharp edged pins six inches in diameter to disintegrate them sufficiently for thorough examination of their contents, the number of drops required apparently varying inversely as the non-ferrous content.

It is a feature of my invention that when a bale has been impaled upon the pins but not thoroughly disintegrated thereby it may readily be raised therefrom by a crane and lifting magnet or other suitable apparatus even if some of the pins have become tightly wedged in the bale, since due to engagement of the flanges on the pins with the cover plate overlying them, the considerable mass of the bed plate and the random arrangement of the pins of different lengths which prevents wedging of masses of scrap between adjacent pins, the bale substantially automatically frees itself from the pins when it is raised after each drop. In addition to preventing withdrawal of the pins from the apparatus the flanges 10 also assist in keeping the pins upright in proper upstanding position on the bed plate at and immediately following impact of the bale thus eliminating necessity for manually rearranging the pins prior to each drop, and in practice it has been found that with the aid of a magnet and crane a bale may be successively raised and dropped a plurality of times upon the apparatus with only about two minutes elapsing between successive impacts. Thus, in a period of two hours twelve bundles or bales of ferrous metal scrap have been opened sufficiently for thorough examination by the use of a single crane with my apparatus, whereas former methods with which I am familiar require about an hour of work to effect separation of a single bale sufficiently for inspection. As a consequence in comparison with the cost of such former methods bales of ferrous metal can be properly opened with the aid of my invention for about 66 cents per bale and thus at a substantial saving over the approximately $2.50 per bale cost of the least expensive former procedure with which I am familiar.

My apparatus requires little upkeep expense since when the pins are made of steel of suitable quality they maintain their edges sufficiently sharp for a long period of useful life and they may of course easily be resharpened when they become dull. The cover plate in time may be slightly deformed by impact of the bales dropped upon it but if so it then usually is depressed to a position where it receives at least some support from the flanges 10 on the pins and hence cannot readily be further deformed sufficiently to become unserviceable.

Utilization generally of the apparatus of my invention, or even knowledge by dealers in scrap of its availability for use in examining bales of scrap metal may result in substantial reduction if not elimination of the practice for one reason or another of including foreign material in bales of scrap metal so that ultimately the breaking open of the scrap bales may be required only for checking purposes.

While I have herein described with considerable particularity one embodiment of my invention and have given dimensions for certain of the parts thereof found suitable in apparatus which has been satisfactorily employed in the manner and for the purposes herein disclosed, it will be understood I do not desire or intend thereby to limit or confine myself in any way as changes and modifications in the form, structure, arrangement and relationship of the several parts, in their relative dimensions and the materials of which they are made as well as in the mode of use of the apparatus as a whole will readily occur to those skilled in the art and may be made if desired without departing from the spirit and scope of the invention as defined in the appended claims.

Having thus described my invention, I claim and desire to protect by Letters Patent of the United States:

1. Apparatus for use in opening bales of scrap metal by impact of the bale when permitted to freely fall thereon from a height materially greater than the maximum height of the apparatus, said apparatus comprising a rigid base providing an upwardly facing plane supporting surface, a plurality of generally cylindrical elements of variant axial length respectively wedge shaped at its upper end disposed in upstanding spaced side-by-side relation on the base in a plurality of rows, the elements in each row being staggered with respect to those in the adjacent row, an apertured plate overlying the base, the plate apertures respectively freely receiving said elements, means interposed between said surface and said plate for supporting the latter from and in spaced relation to the base and a peripheral flange extending from and carried by each element adjacent its other end between said plate and said surface operative to engage the plate and inhibit withdrawal of the element through the corresponding plate aperture.

2. Apparatus for use in opening bales of scrap metal by impact of the bale when permitted to freely fall thereon from a height materially greater than the maximum height of the apparatus, said apparatus comprising a rigid base providing an upwardly facing plane supporting surface, a plurality of elements of variant length disposed in upstanding spaced side-by-side relation on the base having substantially wedge shaped ends, an apertured plate overlying the base, the plate apertures respectively receiving said elements, and means interposed between said surface and said plate for supporting the latter from the base in spaced relation thereto, each said element comprising a substantially cylindrical body having its substantially wedge shaped end oppositely beveled to define a diametral edge and a radially extending flange adjacent its opposite end of outer diameter greater than the diameter of the corresponding plate aperture and of thickness less than the space between said surface and said plate.

References Cited in the file of this patent

UNITED STATES PATENTS

| Number | Name | Date |
|---|---|---|
| 273,477 | Dodge | Mar. 6, 1883 |
| 287,108 | Dodge | Oct. 23, 1883 |
| 626,529 | Ducat | June 6, 1899 |
| 1,020,762 | Judson | Mar. 19, 1912 |
| 1,576,472 | Riley | Mar. 9, 1926 |
| 1,630,158 | Allen | May 24, 1927 |
| 1,965,177 | Finkl | July 3, 1934 |
| 1,978,659 | Whittaker | Oct. 30, 1934 |
| 2,061,265 | Yeomans | Nov. 17, 1936 |
| 2,070,097 | Stipe | Feb. 9, 1937 |
| 2,261,452 | Reed | Nov. 4, 1941 |

FOREIGN PATENTS

| Number | Country | Date |
|---|---|---|
| 18,216 | Great Britain | Dec. 13, 1888 |
| 18,487 | Great Britain | Sept. 16, 1901 |
| 484,728 | Germany | Oct. 21, 1929 |
| 578,292 | Great Britain | June 21, 1946 |